July 11, 1950     V. POMERNACKI     2,514,414
AUTOMOBILE FOOT-PEDAL SAFETY CONTROL
Filed Jan. 9, 1947     3 Sheets-Sheet 1
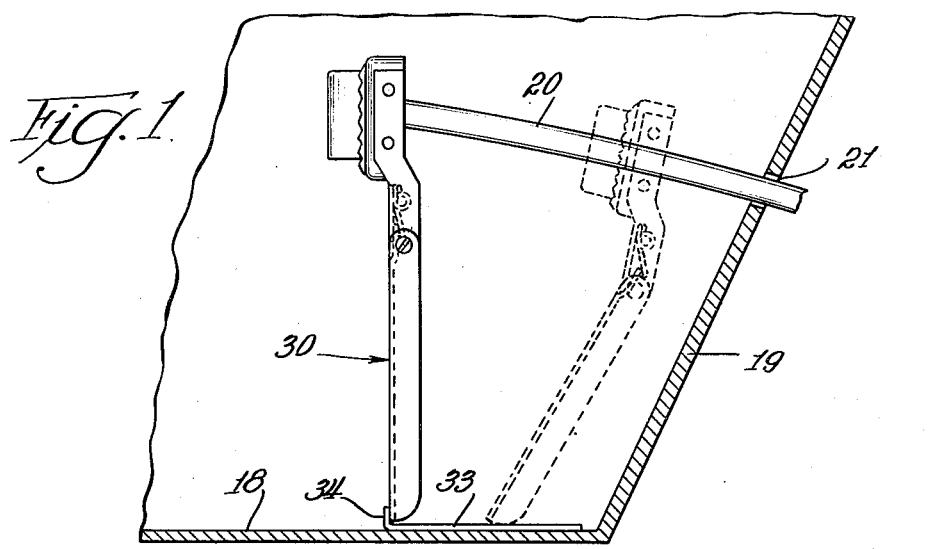
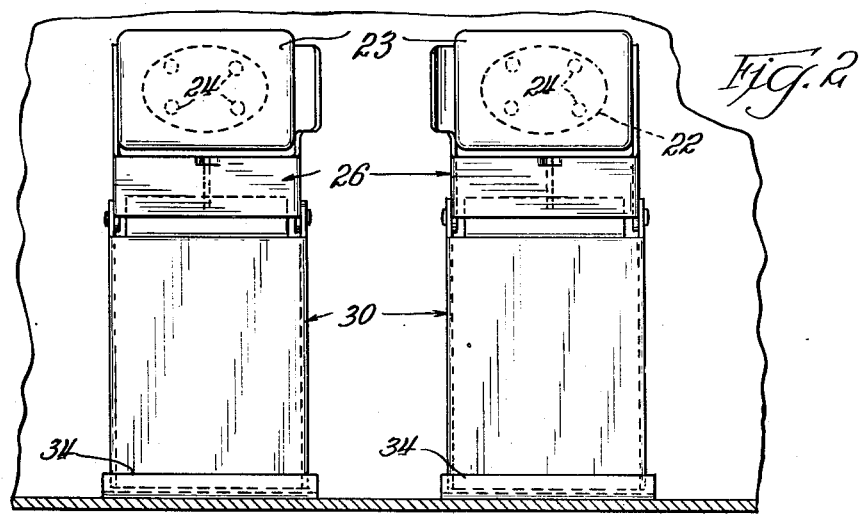
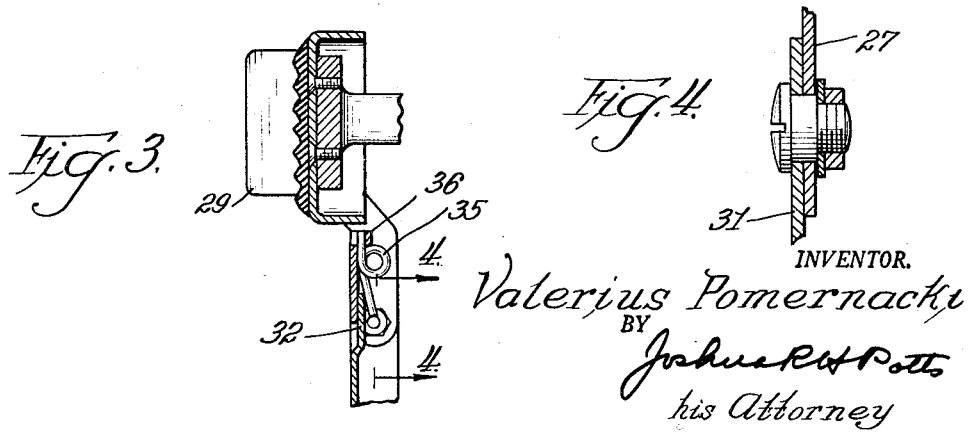
INVENTOR.
Valerius Pomernacki
BY Joshua R. H. Potts
his Attorney

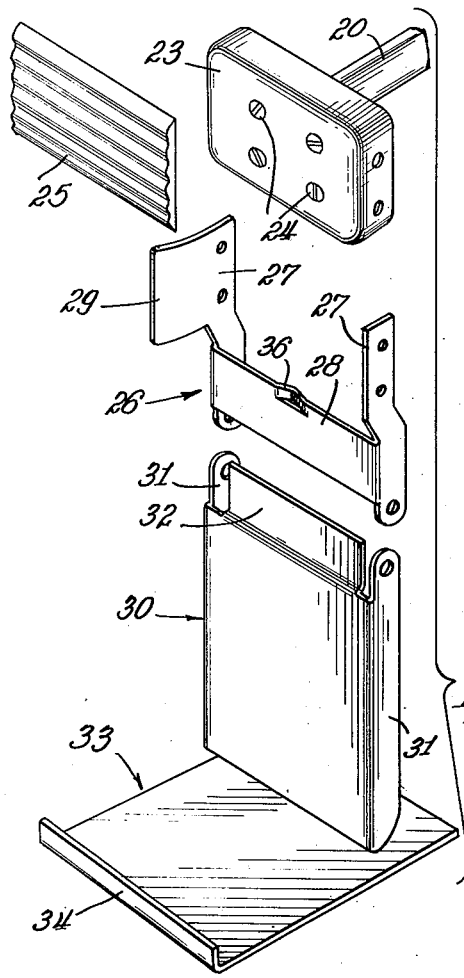
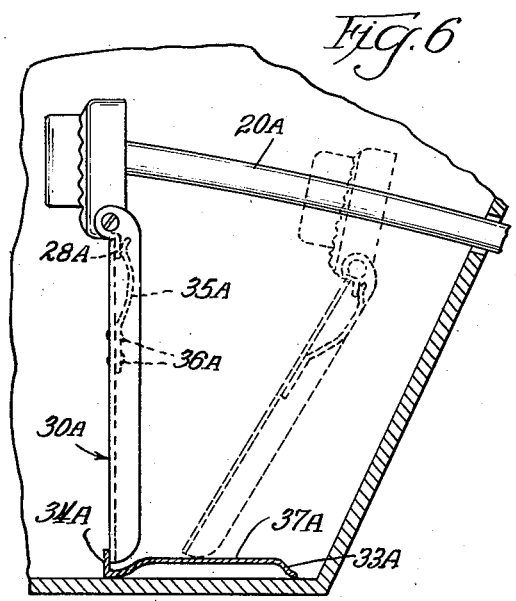
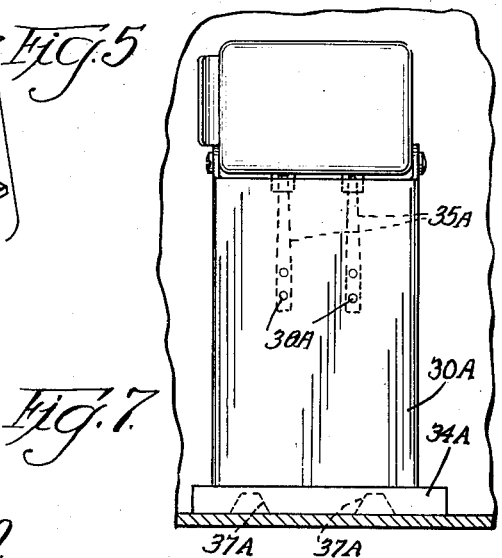
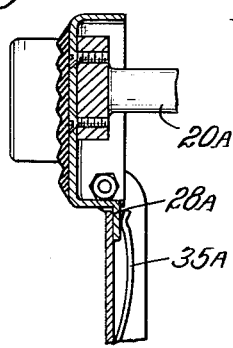

July 11, 1950 V. POMERNACKI 2,514,414
AUTOMOBILE FOOT-PEDAL SAFETY CONTROL
Filed Jan. 9, 1947 3 Sheets-Sheet 3

INVENTOR.
Valerius Pomernacki
BY
his Attorney

Patented July 11, 1950

2,514,414

UNITED STATES PATENT OFFICE 2,514,414

AUTOMOBILE FOOT-PEDAL SAFETY CONTROL

Valerius Pomernacki, Chicago, Ill.

Application January 9, 1947, Serial No. 721,047

2 Claims. (Cl. 74—562)

1

This invention relates to safety means. More particularly, it relates to a foot-pedal control, such as an automobile foot-pedal safety control.

This invention relates to certain new and simplified improvements to fit foot pedals in various makes of cars, for safety control, to guide the feet into proper position on the brake and clutch pedals by which the automobile is controlled, to simplify driving and minimize accidents.

Everyone is familiar with the toll that automobile accidents take. It is generally believed that a substantial percentage of this toll is caused by mistakes due to the excitement of the driver. For example, in such excitement, when he intends to put his foot on the brake, it may slip off the pedal, or he may by mistake put his foot on the gas, and only speed up the car, instead of stopping it.

It is believed that by having an effective means for assuring that the driver will step on the brake and not on the gas that the toll due to mistakes from excitement would be substantially reduced.

The object of my invention is to place an improved device on the pedal or pedals, so that by limiting contact with the driver's foot, the autoist will instinctively know that his foot is on the proper pedal, and will not slip off of it, and so that he will also know almost instinctively that his foot is on the proper pedal, and not on the gas pedal.

I have shown various forms of the device of my invention, some for various floor-board arrangements, etc.

Another object of my invention is to provide insurance of stopping the car, whether the foot slips off the side of the pedal or off the bottom of the pedal.

Another object of my invention is to return the pedal promptly to its normal position, ready for instant re-operation.

The device of my present invention is either an alternative or an improvement over the devices shown in my previous patents, to wit: Patent No. 2,163,963, issued June 27, 1939; Patent No. 2,167,959, issued Aug. 1, 1939; Patent No. 2,225,423, issued Dec. 17, 1940, and Patent No. 2,217,233, issued Oct. 8, 1940, the Pat. No. 2,217,233 being issued on a divisional application of the file on the subject matter of the application for Pat. No. 2,225,423.

Other objects and advantages will appear and be brought out more fully in the following specification, reference being had to the accompanying drawings, in which:

2

Fig. 1 is a sectional elevation of my device shown applied to a floor board.

Fig. 2 is a front view of the same.

Fig. 3 is an enlarged vertical detail section.

Fig. 4 is a detail section on the line 4—4 of Fig. 3.

Fig. 5 is an exploded perspective.

With reference to the second form, I have shown in Fig. 6 an elevation view of the same.

Fig. 7 is a front view of the same.

Fig. 8 is an enlarged vertical detail section.

Fig. 9 is a detail view of the spring.

Fig. 10 is a top view of one of the elements.

Figure 11:
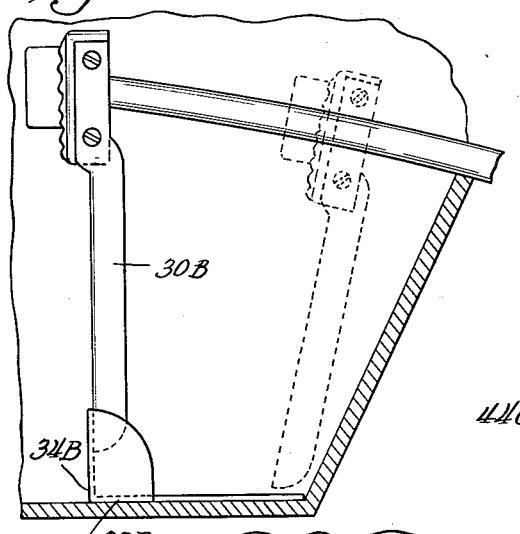

Fig. 11 is an elevation of another modification.

Figure 12:
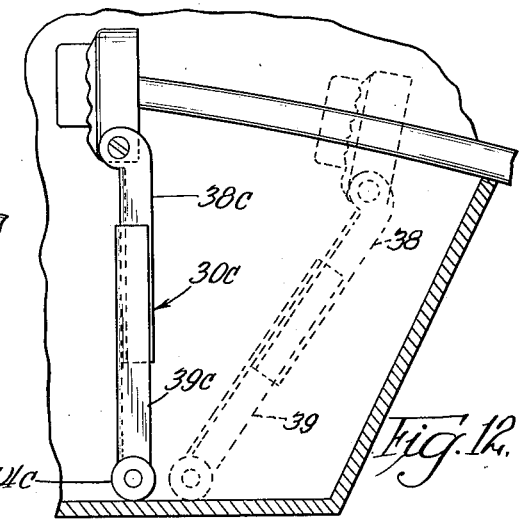

Fig. 12 is a fourth modification, which is adjustable.

Figure 13:
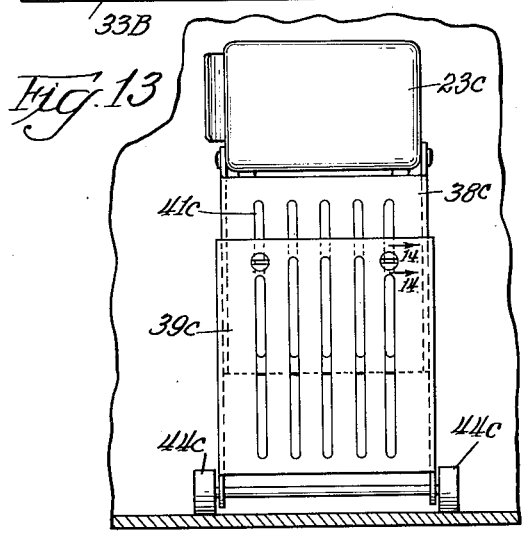

Fig. 13 is a front view of the same.

Figure 14:
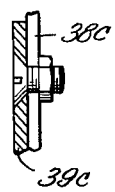

Fig. 14 is a detail section on the line 14—14 of Fig. 13.

Figure 15:
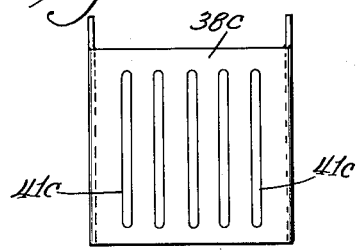

Fig. 15 is an elevation showing the adjustable elements separated.

Figure 16:
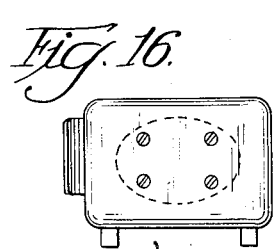

Fig 16 is a view of the pedal cap.

Figure 17:
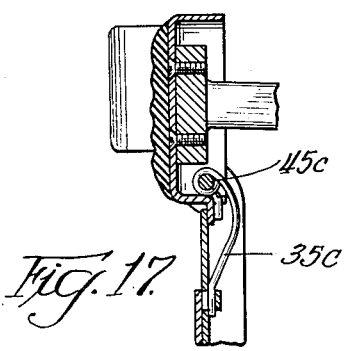

Fig. 17 is an enlarged vertical detail section of the fourth modified form.

Referring to the drawings in detail, I have shown my device in position in connection with a common floor-board of an automobile. I have shown a floor-board 18 and a fire wall 19.

I have also shown the usual brake-rod 20, which extends through an opening 21 in the firewall 19.

Mounted on the rod 21 is the pedal 22. Adapted to be supported on the pedal, is a pedalcap 23, by means of screws 24.

Adapted to be supported in turn by the pedal cap is a cover 25, which may be made of rubber or other suitable material.

Secured also to the cap, is a bracket 26, having side walls 27 and a cross-piece 28. The side walls 27 are adapted to be secured to the cap by means of screws or welding, etc.

On one leg 27, I have a guide 29, which may be integrally formed.

As is well-known heretofore, a great many accidents have been due to the fact that when drivers have attempted to press their feet on the brake pedal to bring their car to a stop, they have missed it and have many times put their foot on the gas pedal by mistake. This most importantly and perhaps most frequently happens in an emergency. It is not necessary here to emphasize the importance of placing the foot on the brake pedal, especially in an emergency, nor the danger inherent in not doing so; nor the consequences to life and property if such is done.

It is to avert the foot being misplaced, with tragic results, that I have designed the guide 29, in the preferred form of my invention. The extension does not have to take any particular dimensions. The important concept is that there be some extension or device, so that when an attempt is made to swing the foot into place, the same can be done with confidence, inasmuch as the operator will know that he will have a positive guide for his foot going to the right place.

My device practically makes the operation of the brake fool-proof.

Adapted to be secured to the bracket, is a pedal extension 30, having flanges 31 and stop-lug 32. The parts are adapted to be secured by means of ears and screws or other suitable means, as shown in detail in Fig. 4.

The extension 30 functions in case the foot is moved too low, whereas, the guide 29 functions when the foot is placed to the side. If the foot is placed too low, the extension 30 will be pushed forward, and will operate the brake nevertheless, even though the foot would have been placed too low in structures heretofore known, and the car would not have been stopped. In such case, the car would have gone on and a crash might have followed.

I have also provided a wear and stop plate 33, having a stop or limiting flange 34. The plate saves the usual mat from being worn by the pedal extension 30, and the stop-plate 34 limits the movement of the pedal extension 30 upon the return of the same after the withdrawal of the foot.

To return the pedal extension, I have provided a spring 35, anchored at one end in a punched-up ring 36, in the form shown. At its other end, it bears against the stop-lip 32.

It will be manifest that the spring is constantly urging against the pedal extension, to return it to its normal position.

In Fig. 6, I have shown a first modification. In the first modification, I again use the same brake-rod, floor-board, fire-wall, pedal, pedal cap and pedal bed.

In this form, I mount the extension 30a directly on the pedal cap, and the extension is in one piece. The extension is similar in shape to the extension 30, and is pivotally attached to the pedal cap by means of a screw or other suitable means.

The screw is preferably shouldered to provide free swinging. In the same way, if the foot should be placed too low against the extension 30a, the brake will nevertheless be operated, as in the first illustration.

In the illustrations hereafter, the same numbering will be used, except that there will be additional suffixed letters according to the modification.

In Fig. 6, there is also a spring 35a, for returning the extension. The spring is fixed at the lower end by rivets or other suitable means 36a.

The upper end merely bears against extensions 28a, said extensions being integral in the form shown.

The spring is tapered from the bottom to the top, and is curved, as shown in Fig. 6.

In Fig. 6, an additional difference is that in addition to having a plate 33a with a stop 34a, there is a rise 37a. This rise may be bent or punched up, or welded on, or arranged in some other suitable manner.

It will be understood that the rise 37a, such as shown in Fig. 6, should be placed on both sides of the plate 33a.

In this form, when the foot is placed upon the extension 30a, the rise 37a will limit the movement of the lower end of the extension 30a in the initial phase of the movement. The spring 35a, in this construction, may be omitted, since the construction will operate satisfactorily without it.

In the form shown in Fig. 11, there is a rigid extension 30b. This form is also economical to manufacture and easy to apply to a car.

There is preferably also a floor plate 33b with an upward extension 34b to close the gap between the floor and the pedal extension. Extension 30b is provided with flanges and a cross plate, as shown in Fig. 1 at 26.

In the form shown in Fig. 12, there is an adjustable extension 30c, which is pivotally secured to the pedal cap, as described in previous forms.

The adjustable extension comprises an upper extension 38c and a lower extension 39c. The upper extension fits within the lower one. The extensions are adjustably arranged by means of screw openings 40c in the lower one of the form shown and slots 41c in the upper extension.

By means of nuts functioning with these screws, the extensions may be properly secured together, as shown in detail in Fig. 14.

On the lower extension, are ears 42c, having openings for the axles 43c, for carrying wheels 44c, which eliminate the use of wear-plates, as shown in previous forms; however, a stop may be employed to limit outward swinging, if desired.

Also, in this form, the pedal cap is provided with holes, to accommodate a bolt 45c, for supporting an upper end of a spring 35c. The lower end of the spring may be anchored by welding or otherwise.

As in the previous case, the spring bears, to return the extension to its normal position after it has served its function.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. In a device of the kind described, an extension for a pedal of a vehicle, so that in case the foot should slip off the pedal and strike the extension, the pedal will nevertheless be operated, said extension being pivoted at its upward end to the pedal, and free at its lower end, and a spring for maintaining said extension in a desired position with respect to said pedal and returning said pedal extension to said position upon release of actuating pressure from said pedal or extension.

2. In a device of the kind described, an extension for a pedal of a vehicle so that in case the foot should slip off the pedal and strike the extension the pedal will nevertheless be operated, said extension being pivoted at its upward end to the pedal, and free at its lower end, a spring for urging said pedal extension into a desired position relative to said pedal, and a limiting element for limiting the movement of the lower end of the extension.

VALERIUS POMERNACKI.

REFERENCES CITED

The following references are of record in the file of this patent:

UNITED STATES PATENTS

| Number | Name | Date |
|---|---|---|
| 1,213,826 | Bloom | Jan. 30, 1917 |
| 1,406,402 | May | Feb. 14, 1922 |
| 1,487,385 | Hoy | Mar. 18, 1924 |
| 1,516,862 | Loury | Nov. 25, 1924 |
| 1,755,002 | Hibbets | Apr. 15, 1930 |
| 2,068,962 | Sanford | Jan. 26, 1937 |
| 2,088,182 | Verch | July 27, 1937 |
| 2,217,233 | Pomernacki | Oct. 8, 1940 |
| 2,225,423 | Pomernacki | Dec. 17, 1940 |
| 2,395,280 | Law | Feb. 19, 1946 |